United States Patent
Takeuchi

(10) Patent No.: US 10,623,644 B2
(45) Date of Patent: Apr. 14, 2020

(54) IMAGE PICK-UP APPARATUS AND CONTROL METHOD THEREOF

(71) Applicant: CANON KABUSHIKI KAISHA, Tokyo (JP)

(72) Inventor: Kenji Takeuchi, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 21 days.

(21) Appl. No.: 16/051,783

(22) Filed: Aug. 1, 2018

(65) Prior Publication Data

US 2019/0045127 A1 Feb. 7, 2019

(30) Foreign Application Priority Data

Aug. 3, 2017 (JP) .................. 2017-151024

(51) Int. Cl.

| | |
|---|---|
| *H04N 5/232* | (2006.01) |
| *G03B 5/00* | (2006.01) |
| *H04N 19/139* | (2014.01) |
| *G06T 7/207* | (2017.01) |
| *H04N 5/357* | (2011.01) |

(52) U.S. Cl.
CPC ......... *H04N 5/23287* (2013.01); *G06T 7/207* (2017.01); *H04N 5/23229* (2013.01); *H04N 5/23245* (2013.01); *H04N 5/23254* (2013.01); *H04N 5/23258* (2013.01); *H04N 5/23267* (2013.01); *H04N 5/357* (2013.01); *H04N 19/139* (2014.11)

(58) Field of Classification Search
CPC ............. H04N 5/2251; H04N 5/23229; H04N 5/23245; H04N 5/23251; H04N 5/23254; H04N 5/23258; H04N 5/23267; H04N 5/23287; H04N 5/357; H04N 19/139; G06T 7/207; G03B 5/00
See application file for complete search history.

(56) References Cited

U.S. PATENT DOCUMENTS

| | | | |
|---|---|---|---|
| 8,494,225 B2 | 7/2013 | Center | |
| 2011/0157380 A1* | 6/2011 | Yamazaki | .......... H04N 5/23248 348/208.4 |

(Continued)

*Primary Examiner* — Lin Ye
*Assistant Examiner* — Chriss S Yoder, III
(74) *Attorney, Agent, or Firm* — Cowan, Liebowitz & Latman, P.C.

(57) ABSTRACT

A vibration sensor of an image pick-up apparatus detects shake of an image pick-up apparatus and acquires shake information. An imaging unit outputs an image signal of a subject to an imaging signal processing unit. A motion vector detection unit calculates a motion vector according to an image signal after imaging. A feature point tracking unit performs feature point tracking by calculating a coordinate value of a subject on a photographing screen using the motion vector. A feature coordinate map and position and attitude estimation unit estimates a position or attitude of the image pick-up apparatus on the basis of information obtained by a band limit filter performing band limitation on shake information from a vibration sensor and an output of the feature point tracking unit. An estimation unit evaluates an estimation error, and changes a band limited by the band limit filter on the basis of the calculated evaluation value or changes a correction magnification at the time of correcting the estimation value according to a correction value.

20 Claims, 11 Drawing Sheets

(56) References Cited

U.S. PATENT DOCUMENTS

2011/0304706 A1* 12/2011 Border .................. G03B 35/02
                                                      348/50
2017/0026581 A1* 1/2017 Ryu ..................... G06K 9/6211

* cited by examiner

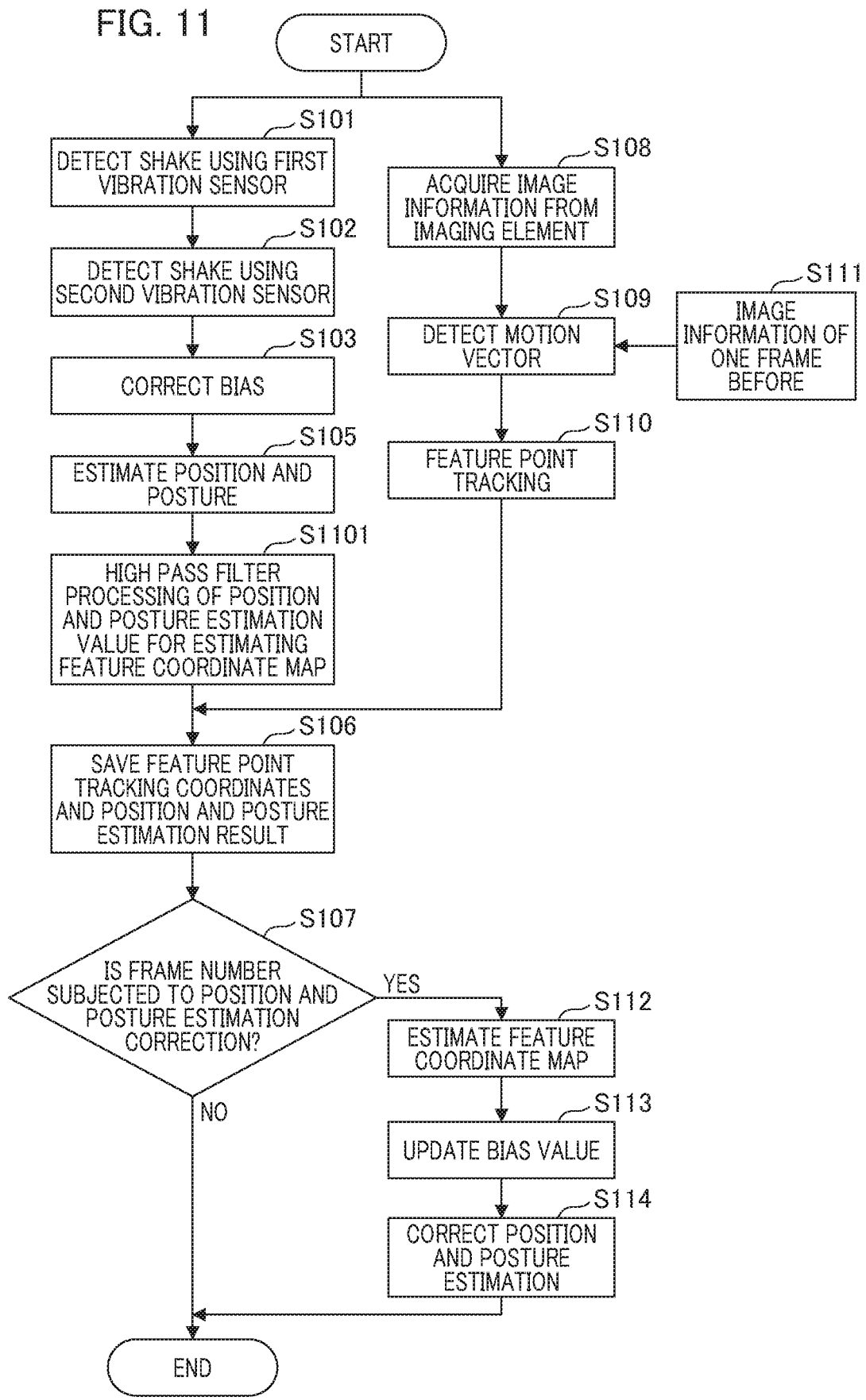

IMAGE PICK-UP APPARATUS AND CONTROL METHOD THEREOF

BACKGROUND OF THE INVENTION

Field of the Invention

The present invention relates to an optical apparatus such as a video camera, a digital still camera, or an interchangeable lens thereof, and more particularly to an image pick-up apparatus having a self-position and attitude estimation function and a control method thereof.

Description of the Related Art

There is an image pick-up apparatus which has a function of correcting image shake of a subject occurring due to hand shake, and the like. It is necessary to detect vibration and an attitude change applied to a main body of an image pick-up apparatus using an inertial sensor to perform image shake correction. In addition, a position change due to a movement intended by a photographer (hereinafter referred to as camera work) occurs in photographing in which the photographer captures a subject (a moving object or a still object) within a photographing angle of view while moving with the subject. The image pick-up apparatus needs to detect the position change due to camera work separately from the attitude change thereof.

There are methods using inertial navigation data of an inertial sensor and positioning data of the Global Positioning System (GPS) as a method for acquiring information of the position and attitude of a moving object. U.S. Pat. No. 8,494,225 discloses a method of correcting an estimation error of position and attitude estimation information estimated by an inertial sensor using movement information of an image. Moreover, there is a position and attitude estimation (visual and inertial sensor fusion) technology which uses a structure from motion (SFM) and an inertial sensor as a self-position estimation method for detecting an attitude and position of an image pick-up apparatus. A method of estimating a three-dimensional position of an object in a real space and the position and attitude of an image pick-up apparatus using this technology is known.

According to the prior art, if variation of a bias error of an inertial sensor is very large due to variation of a photographing environment, or if an output of an inertial sensor greatly varies due to a sudden change of camera work, and the like, correction using image information may not be correctly performed. Alternatively, if it takes a long time until a bias error is correctly corrected, there are problems that correct position and attitude estimation is not performed and the like until the correction is completed.

SUMMARY OF THE INVENTION

The present invention provides an image pick-up apparatus capable of acquiring shake information and performing position and attitude estimation with higher accuracy, and a control method thereof.

An apparatus according to an aspect of the present invention is an image pick-up apparatus that acquires an image signal using an imaging unit comprising: a memory; and one or more processors, wherein the processor functions as the following units according to a program stored in the memory: a first acquisition unit configured to acquire first information indicating shake of the image pick-up apparatus detected by a shake detection unit; a second acquisition unit configured to acquire second information indicating a movement of a subject detected in an image signal by the imaging unit; and an estimation unit configured to estimate a position or attitude of the image pick-up apparatus, wherein the estimation unit includes a calculation unit configured to calculate an estimation value of the position or attitude of the image pick-up apparatus according to the band-limited first information or the first and second information, and a correction unit configured to calculate a correction value for the estimation value using the second information.

Further features of the present invention will become apparent from the following description of exemplary embodiments (with reference to the attached drawings).

BRIEF DESCRIPTION OF THE DRAWINGS

FIG. 11 is a flowchart of position and attitude estimation processing according to the second embodiment.

DESCRIPTION OF THE EMBODIMENTS

Embodiments of the present invention will be described with reference to accompanying drawings. In each embodiment, an image pick-up apparatus having a position and attitude estimation function is exemplified.

First Embodiment

Figure 1:
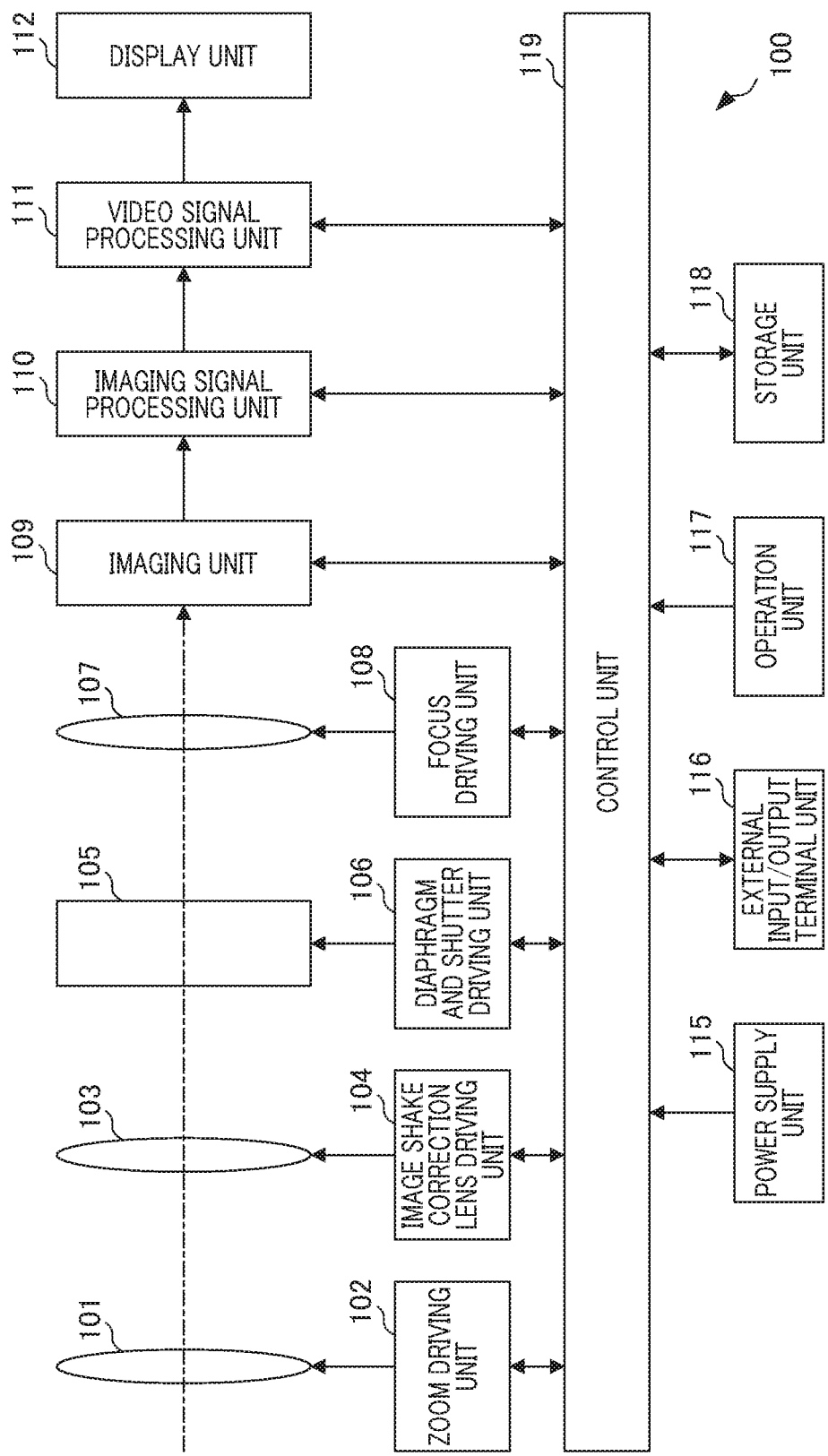
FIG. 1 is a diagram which shows a configuration example of an image pick-up apparatus according to embodiments of the present invention.

FIG. 1 is a block diagram which shows a configuration example of an image pick-up apparatus according to the present embodiment. An image pick-up apparatus 100 is, for example, a digital still camera, and has a moving image photographing function.

The image pick-up apparatus 100 includes a zoom unit 101. The zoom unit 101 constitutes an image formation optical system, and includes a zoom lens for changing photographing magnification. A zoom driving unit 102 drives the zoom unit 101 in accordance with a control signal from a control unit 119. An image shake correction lens (hereinafter referred to as a correction lens) 103 is a movable optical member that corrects image shake. The correction lens 103 is movable in a direction orthogonal to an optical axis direction of an imaging optical system. An image shake correction lens driving unit 104 controls driving of the correction lens 103 in accordance with a control signal from the control unit 119. A diaphragm/shutter unit 105 includes a mechanical shutter having a diaphragm function. A diaphragm and shutter driving unit 106 drives the diaphragm/shutter unit 105 in accordance with a control signal from the control unit 119. A focus lens 107 is a movable lens used for focal point adjustment, and its position can be changed along the optical axis of the imaging optical system. A focus driving unit 108 drives the focus lens 107 in accordance with a control signal from the control unit 119.

The imaging unit 109 acquires an image signal by converting an optical image formed by the imaging optical system into an electric signal in a pixel unit by an imaging element such as a CCD image sensor or a CMOS image sensor. CCD is an abbreviation for "charge coupled device." CMOS is an abbreviation for "complementary metal-oxide semiconductor." An imaging signal processing unit 110 performs an analog (A)/digital (D) conversion, correlated double sampling, gamma correction, white balance correction, and color interpolation processing on an image signal output by the imaging unit 109 to convert it into a video signal.

A video signal processing unit 111 processes an image signal acquired from the imaging signal processing unit 110 in accordance with an application. Specifically, the video signal processing unit 111 generates an image signal for display, and performs processing for converting it into code or processing for converting it into a data file for recording. A display unit 112 displays an image when necessary in accordance with an image signal for display output by the video signal processing unit 111. A power supply unit 115 supplies power to each unit of the image pick-up apparatus in accordance with an application. An external input/output terminal unit 116 is used for receiving or outputting a communication signal and a video signal from or to an external device. An operation unit 117 has an operation member such as a button or switch for a user to give an instruction to the image pick-up apparatus. For example, the operation unit 117 has a release switch which is configured such that a first switch (denoted as SW1) and a second switch (denoted as SW2) are sequentially turned on in accordance with a push amount of a release button. In addition, the operation unit 117 has various types of mode setting switches. A storage unit 118 stores various types of data containing image (or video) information or the like.

The control unit 119 has, for example, a CPU, a ROM, and a RAM. CPU is an abbreviation for "central processing unit." ROM is an abbreviation for "read only memory." RAM is an abbreviation for "random access memory." The CPU develops a control program stored in the ROM in the RAM, and controls each unit of the image pick-up apparatus 100 to realize various operations to be described below. If SW1 is turned on by performing a half-press operation on the release button included in the operation unit 117, the control unit 119 calculates an auto focus (AF) evaluation value on the basis of a video signal for display output to the display unit 112 by the video signal processing unit 111. The control unit 119 performs automatic focal point detection and focal point adjustment control by controlling the focus driving unit 108 on the basis of the AF evaluation value. In addition, the control unit 119 performs automatic exposure (AE) processing to determine a diaphragm value and a shutter velocity for obtaining an appropriate exposure amount on the basis of luminance information of a video signal and a predetermined program chart. Furthermore, if SW2 is turned on by performing a full-press operation on the release button, the control unit 119 performs photographing processing using the diaphragm value and shutter velocity which are determined, and controls each processing unit such that image data obtained by the imaging unit 109 is stored in the storage unit 118.

The operation unit 117 has an operation switch used for selection of an image shake correction (vibration proof) mode. If an image shake correction mode is selected by an operation of this operational switch, the control unit 119 instructs the image shake correction lens driving unit 104 to perform an image shake correction operation. The image shake correction lens driving unit 104 performs an image shake correction operation in accordance with a control command of the control unit 119 until an instruction to turn off the image shake correction is issued. In addition, the operation unit 117 has a photographing mode selection switch capable of selecting one of a still image photographing mode and a moving image photographing mode. Selection processing of a photographing mode is performed by a user's operation of the photographing mode selection switch, and the control unit 119 changes an operation condition of the image shake correction lens driving unit 104. The image shake correction lens driving unit 104 constitutes an image shake correction device of the present embodiment. Moreover, the operation unit 117 has a reproduction mode selection switch for selecting a reproduction mode. If a user selects a reproduction mode by an operation of the reproduction mode selection switch, the control unit 119 performs control to stop the image shake correction operation. The operation unit 117 has a magnification change switch for performing an instruction of a zoom magnification change. If a zoom magnification change is instructed by a user's operation of the magnification change switch, the zoom driving unit 102 which receives the instruction from the control unit 119 drives the zoom unit 101 to move a zoom lens to an instructed position.

Figure 2:
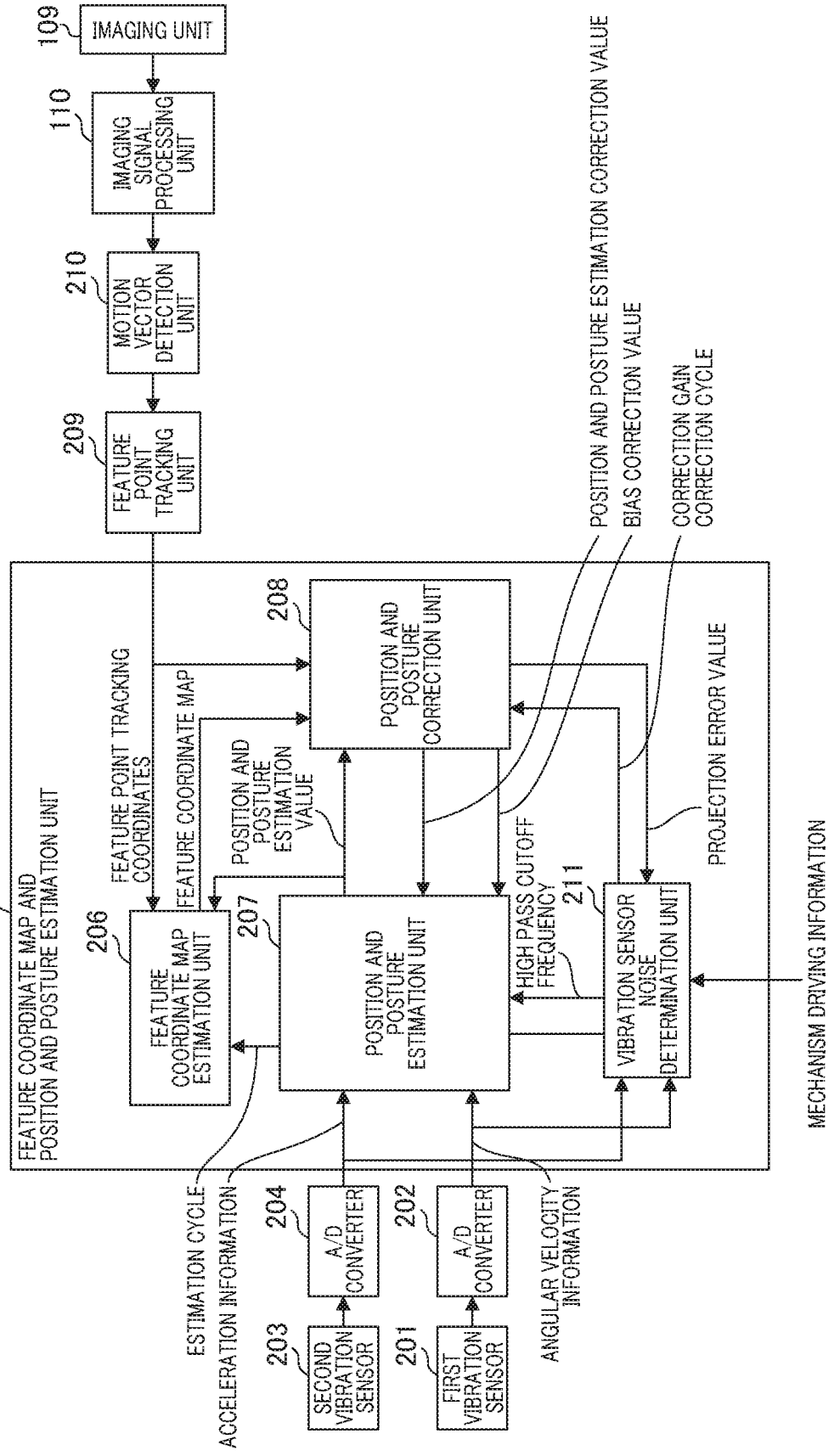
FIG. 2 is a diagram which shows a configuration example of a feature coordinate map and a position and attitude estimation unit according to the embodiments of the present invention.

FIG. 2 is a block diagram which shows a configuration for realizing position and attitude estimation of the image pick-up apparatus according to the present embodiment. The image pick-up apparatus 100 includes a first vibration sensor 201 and a second vibration sensor 203. The first vibration sensor 201 is an angular velocity sensor which detects an angular velocity of the image pick-up apparatus 100, and the second vibration sensor 203 is an acceleration sensor which detects a translational acceleration of the image pick-up apparatus 100. An AD converter 202 converts an analog signal detected by the first vibration sensor 201 into digital data. An AD converter 204 converts an analog signal detected by the second vibration sensor 203 into digital data.

A motion vector detection unit 210 detects a motion vector on the basis of a signal obtained by the imaging signal processing unit 110 processing image data acquired by the imaging unit 109. A feature point tracking unit 209 acquires the motion vector from the motion vector detection unit 210, and detects and tracks a moving position of coordinates at each frame at the time of photographing a moving image for a predetermined feature point in a photographed image.

A feature coordinate map and position and attitude estimation unit (hereinafter, simply referred to as an estimation unit) 205 acquires shake information from each of the vibration sensors 201 and 203 from the AD converters 202 and 204, and shake information based on image information from the feature point tracking unit 209. The estimation unit 205 estimates a feature coordinate map based on this information. The feature coordinate map is information indicating a positional relationship including a position and attitude of the image pick-up apparatus 100 and a depth of a photographed subject with respect to the image pick-up apparatus. The estimation unit 205 is constituted by a feature coordinate map estimation unit 206, a position and attitude estimation unit 207, a position and attitude correction unit 208, and a vibration sensor noise determination unit 211.

Figure 3:
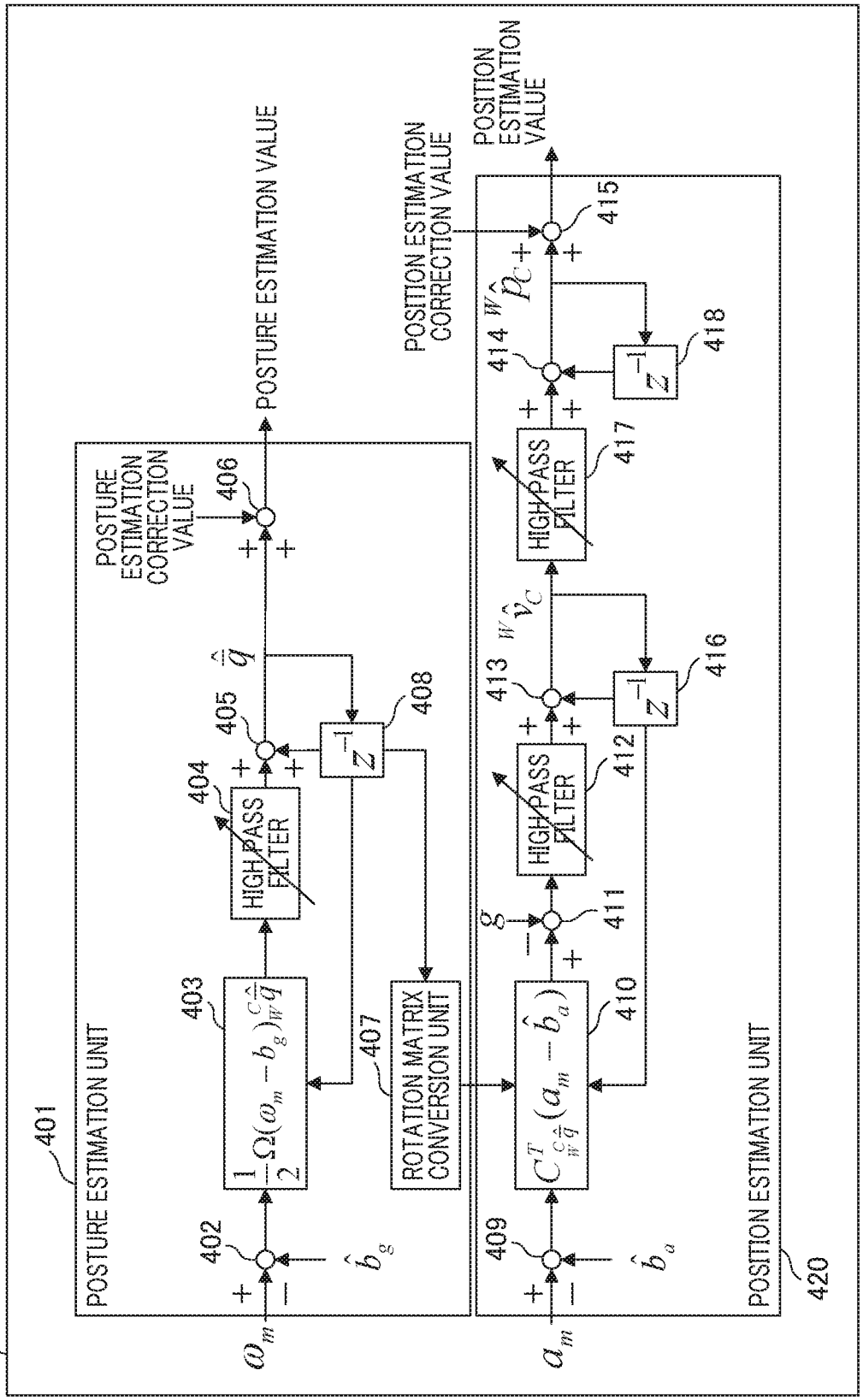
FIG. 3 is a diagram which describes an internal configuration of the position and attitude estimation unit according to a first embodiment of the present invention.

Next, with reference to FIG. 3, a configuration and processing of the position and attitude estimation unit 207 will be described. FIG. 3 is a diagram which shows a configuration example of the position and attitude estimation unit 207. The position and attitude estimation unit 207 is constituted by an attitude estimation unit 401 and a position estimation unit 420. The attitude estimation unit 401 estimates an attitude of the image pick-up apparatus 100, and the position estimation unit 420 estimates a position of the image pick-up apparatus 100.

The attitude estimation unit 401 includes adders 402, 405, and 406. In the following description, subtraction is performed by an adder as addition of a negative value. The attitude estimation unit 401 includes a motion equation operation unit 403 for performing an operation related to an attitude change of the image pick-up apparatus 100, a high pass filter 404, a delay element 408, and a rotation matrix conversion unit 407. The high pass filter 404 which performs band limitation of a frequency band is a filter capable of changing a cutoff frequency. The delay element 408 has a function of delaying a signal by one sample of an operation cycle when an attitude estimation operation is executed at a predetermined cycle. A rotation matrix conversion unit 407 converts attitude information from a quaternion (quaternion) expression to a rotation matrix expression.

In addition, the position estimation unit 420 includes adders 409, 411, 413, 414, and 415, an acceleration operation unit 410 in world coordinates, high pass filters 412 and 417, and delay elements 416 and 418. Both of the high pass filters 412 and 417 are filters capable of changing a cutoff frequency.

First, attitude estimation by the attitude estimation unit 401 will be described. The angular velocity of the image pick-up apparatus 100 and an angular velocity bias estimation value calculated by the position and attitude correction unit 208 to be described below are defined as follows.

$\omega_m$: An angular velocity of the image pick-up apparatus 100 detected by the first vibration sensor 201 (angular velocity sensor)

$\hat{b}_g$: An angular velocity bias estimation value calculated by the position and attitude correction unit 208

The adder 402 performs bias correction using Equation 1 and outputs a result to the motion equation operation unit 403 related to an attitude change.

$$\omega = \omega_m - \hat{b}_g \quad \text{(Equation 1)}$$

An attitude estimation value is defined as in Math 3 below. The delay element 408 outputs an attitude estimation value of one sample before, which is delayed. One sample before means that it is a past time by a length of a cycle (one sampling period) corresponding to a predetermined sampling frequency.

$${}_W^C\hat{q}$$

The motion equation operation unit 403 obtains an attitude using Equation 2 on the basis of the attitude estimation value of one sample before and ω of Equation 1.

$$_W^C\dot{\hat{q}} = \frac{1}{2}\Omega(\omega){}_W^C\hat{q} \quad \text{(Equation 2)}$$

The meanings of the symbols are as follows.
q: Quoternion $${}_W^C\hat{q}$$

Quaternion representing rotation from world coordinates (W) into camera coordinates (C) fixed to the image pick-up apparatus 100

Figure 5:
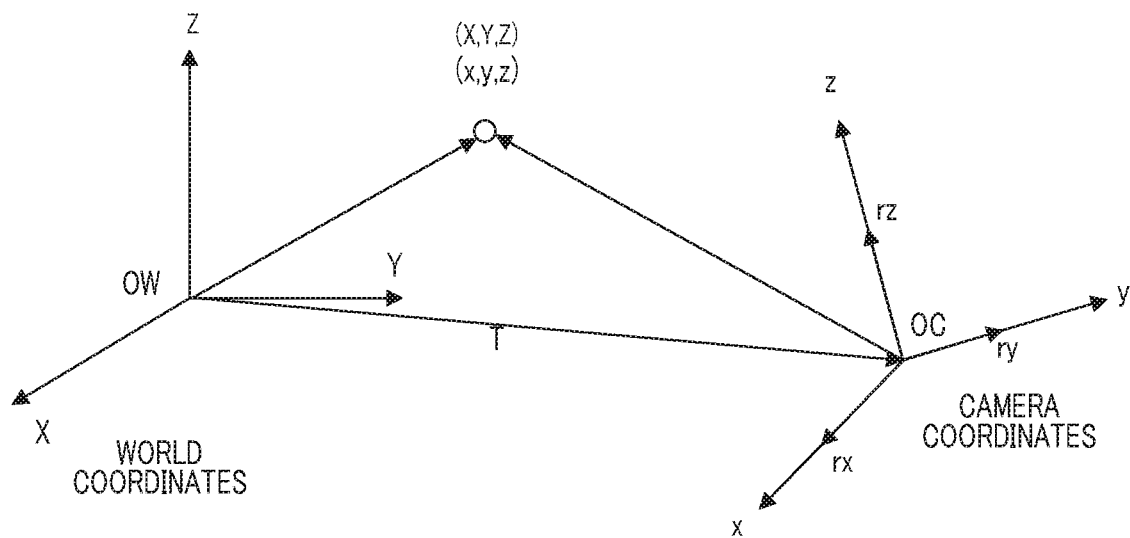
FIG. 5 is a relationship diagram between a coordinate position of an object in world coordinates and a coordinate position in camera coordinates.

The world coordinates are fixed coordinates specifying coordinates of an object regardless of a position of the image pick-up apparatus as shown in FIG. 5. To simplify the description of the present embodiment, it is assumed that a coordinate system using the first vibration sensor 201 and the second vibration sensor 203 coincides with camera coordinates. In addition, $\Omega(\omega)$ in Equation 2 can be calculated using Equation 3.

$$\Omega(\omega) = \begin{bmatrix} -\lfloor \omega \times \rfloor & \omega \\ -\omega^T & 0 \end{bmatrix} \quad \text{(Equation 3)}$$

$\lfloor \omega \times \rfloor$ is a distortion symmetric matrix.

The motion equation operation unit 403 outputs an attitude angle change amount which is an operation result to the high pass filter 404. The high pass filter 404 performs band limitation on the attitude angle change amount to remove a low frequency component. The adder 405 adds an output of the high pass filter 404 and an output of the delay element 408 (the attitude estimation value of one sample before), and operates an attitude estimation value at a next sample. By performing integration after removing a low frequency component in this manner, it is possible to suppress a drift variation of an attitude estimation value by an angular velocity bias error even in a state in which an angular velocity bias estimation value $\hat{b}_g$ is correctly estimated or an estimation error is large.

An output of the adder 405 is sent to the adder 406 and the delay element 408, and the delay element 408 outputs a delay signal to the motion equation operation unit 403 and the rotation matrix conversion unit 407. An attitude estimation value which is an output of the adder 405 is corrected according to an attitude estimation correction value to be described below, and is output as a final attitude estimation value in the adder 406.

Next, position estimation by the position estimation unit 420 will be described. An acceleration of the image pick-up apparatus 100, and an acceleration bias estimation value calculated by the position and attitude correction unit 208 to be described below are defined as follows.

$a_m$: An acceleration of the image pick-up apparatus 100 detected by the second vibration sensor 203 (acceleration sensor)

$\hat{b}_a$: An acceleration bias estimation value calculated by the position and attitude correction unit 208

The adder 409 performs bias correction using Equation 4, and outputs a result to the acceleration operation unit 410 in the world coordinates.

$$a = a_m - \hat{b}_a \quad \text{(Equation 4)}$$

A velocity estimation value is denoted as $\hat{v}_C$.

The delay element 416 outputs the velocity estimation value of one sample before, which is delayed. The acceleration operation unit 410 acquires the velocity estimation value of one sample before and an output of the adder 409. The acceleration operation unit 410 and the adder 411 obtain a velocity of the image pick-up apparatus 100 using Equation 5 and output it to the high pass filter 417 on the basis of a gravity acceleration g in the world coordinates.

$$^w\hat{v}_c = C^T_{^C_W\tilde{q}}(a) - g \quad \text{(Equation 5)}$$

$C^T_{^C_W\tilde{q}}$ A rotation matrix obtained by conversion of an attitude estimation value $^C_W\tilde{q}$ estimated by the attitude estimation unit 401

The second vibration sensor 203 which is an acceleration sensor detects acceleration in the camera coordinate system. It is necessary to convert the coordinate system to set it as acceleration information in the world coordinate system that is originally intended to be estimated. Therefore, processing of converting acceleration information in the camera coordinate system into acceleration information in the world coordinate system is performed according to a rotation matrix $C^T_{^C_W\tilde{q}}$ which is an attitude estimation value of the image pick-up apparatus.

Since the second vibration sensor 203 detects gravity acceleration in addition to acceleration caused by a movement of the image pick-up apparatus 100, the adder 411 removes an influence of gravity acceleration by subtracting the gravity acceleration g from an output of the acceleration operation unit 410 in Equation 5.

Furthermore, measures against influences of an estimation error of an acceleration bias estimation value of $\hat{b}_a$ and an attitude estimation error estimated by the attitude estimation unit 401 are taken in the present embodiment. There is concern that drift may occur in a velocity estimation value $^w\hat{v}_c$ which is calculated by integrating acceleration due to these errors. Therefore, the high pass filter 412 removes a low frequency component error of acceleration information in world coordinates from an output of the adder 411. An output of the high pass filter 412 is acquired by the adder 413, and is added to a delay signal of one sample before of the delay element 416. The delay element 416 acquires an output of the adder 413 and outputs the delay signal to the acceleration operation unit 410.

A velocity estimation value (Math 16) output by the adder 413 further has a low frequency component removed by the high pass filter 417. The adder 414 adds an output of the high pass filter 417 and a position estimation value before one sample output by the delay element 418. An output after the addition $^w\hat{p}_c$ is sent to the adder 415 and the delay element 418. The adder 415 performs correction by adding a position estimation correction value to be described below to an output of the adder 414, and outputs a final position estimation value.

As described above, in position estimation, since a position is estimated by second-order integration processing of acceleration as compared to an attitude estimation operation, if there is a bias error in the acceleration and a velocity estimation value, a drift error may occur in a result of the position estimation. In addition, since a result of estimation by the attitude estimation unit 401 is used when an influence of gravity acceleration is removed from acceleration information, a large drift may occur due to an attitude estimation error. Therefore, in the present embodiment, high pass filter processing is performed in a position estimation operation before the acceleration bias estimation value $\hat{b}_a$ is estimated or while an error of an attitude estimation value estimated by the attitude estimation unit is large. It is possible to suppress a drift of the position estimation value by removing a low frequency component twice by the high pass filters 412 and 417.

Next, a feature coordinate map estimation method in the feature coordinate map estimation unit 206 will be described. The feature coordinate map estimation unit 206 uses Harris corner points, SIFT features, or the like as an extraction method of a feature point. In addition, with regard to a tracking method of a feature point by the feature point tracking unit 209, if a square window centered on a feature point is provided, and a new frame of a moving image is given, a method of obtaining a point at which a residual within a window is the smallest between frames is used. A position and an attitude of the image pick-up apparatus, and a position of a feature point in an actual space imaged by the image pick-up apparatus are simultaneously estimated according to structure from motion (SFM) using feature point tracking information at each frame obtained in this manner.

Figure 4:
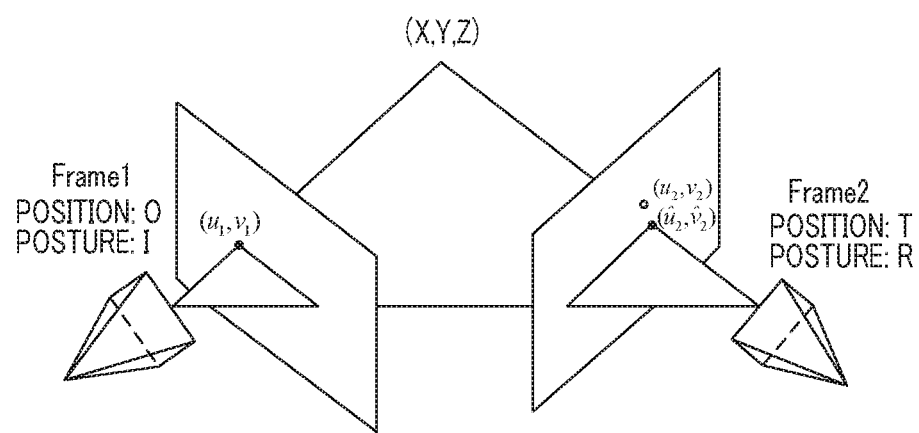
FIG. 4 is a diagram which represents a relationship among a position and attitude of an image pick-up apparatus in a moving image frame, three-dimensional feature point coordinates, and feature point coordinates in a photographed image.

FIG. 4 is a schematic diagram which represents a relationship among a position and attitude of the image pick-up apparatus 100 in a moving image frame, three-dimensional feature point coordinates, and feature point coordinates in a photographed image. Feature coordinates of a feature point coordinate map in a three-dimensional space including depth information to be estimated are expressed as (X,Y,Z). For a camera position and attitude in a first frame (Frame 1), a camera position is expressed as O (origin), and a camera attitude is expressed by I (unit matrix). Feature coordinates on a photographing screen at that time are expressed as ($u_1$, $v_1$).

In addition, for a camera position and attitude in a second frame (Frame 2), a camera position is expressed as T, a camera attitude is expressed as R, and feature coordinates on the photographing screen at that time are expressed as. ($u_2$, $v_2$)

Figure 6:
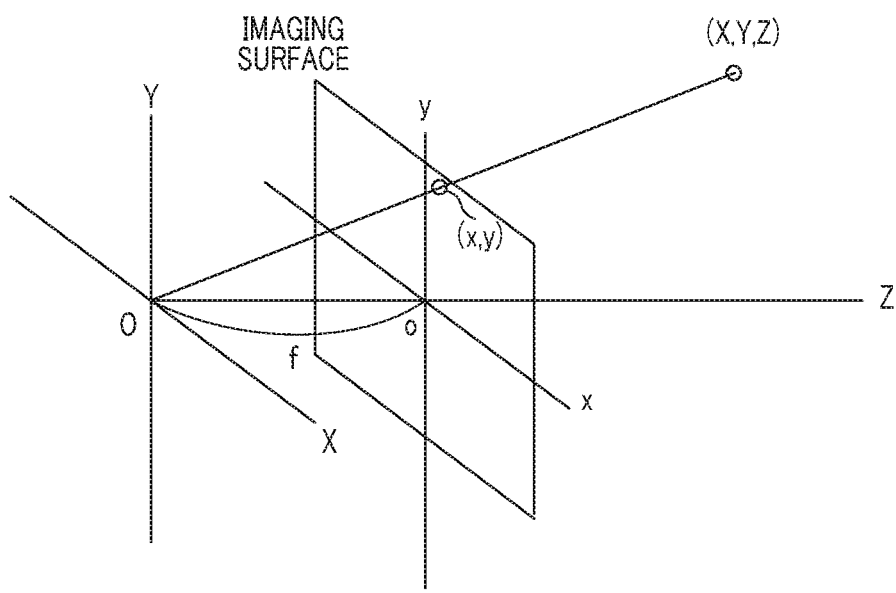
FIG. 6 is a diagram which represents a model of perspective projection in which a virtual imaging surface is set in front of a lens.
Figure 7:
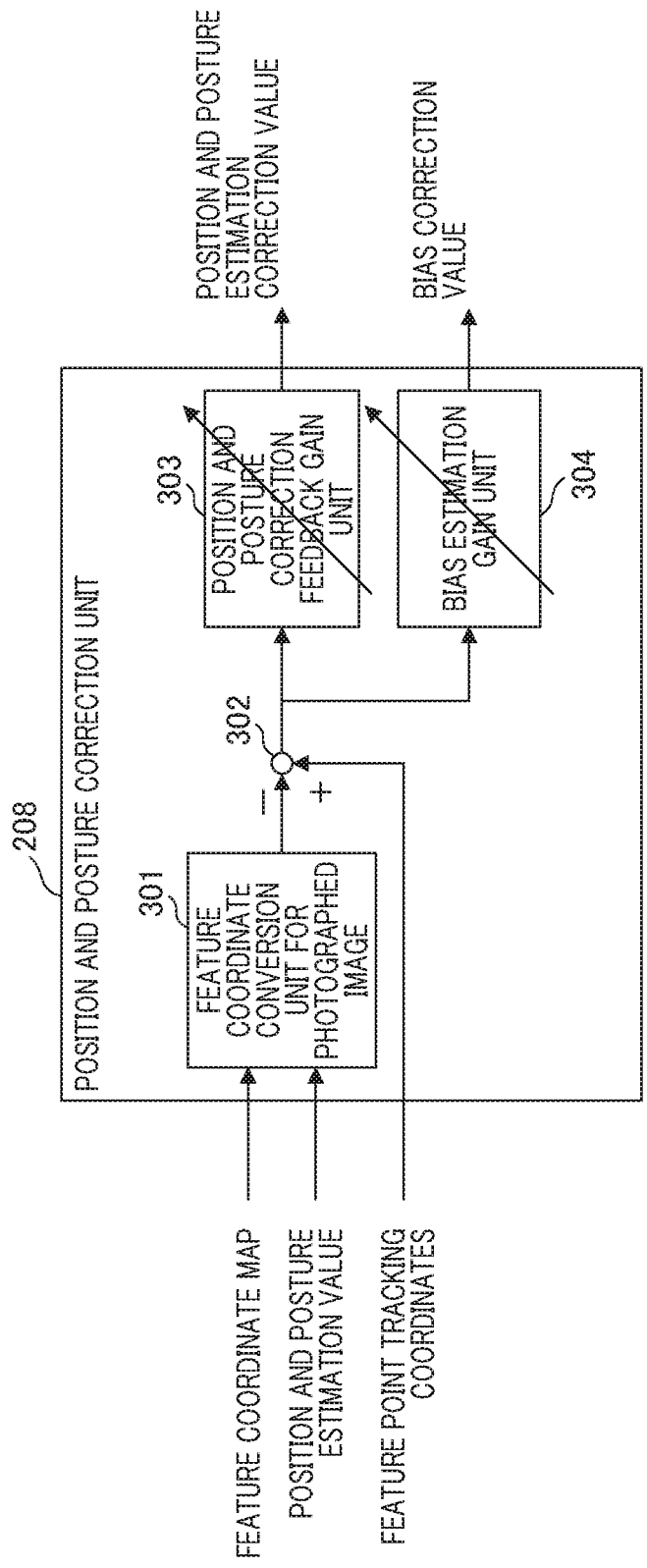
FIG. 7 is a diagram which describes a detailed internal configuration of the position and attitude correction unit.

With reference to FIGS. 5 to 7, a configuration of the position and attitude correction unit 208 will be described. The position and attitude correction unit 208 of FIG. 7 is constituted by a feature coordinate conversion unit for a photographed image 301, an adder 302, a position and attitude feedback gain unit 303, and a bias estimation gain unit 304. The feature coordinate conversion unit for a photographed image is simply called a coordinate conversion unit, and the position and attitude feedback gain unit is simply called a FB gain unit below. A gain value of the FB gain unit 303 corresponds to a correction magnification for position and attitude correction. In addition, a gain value of the bias estimation gain unit 304 corresponds to a correction magnification for bias correction. Each gain value is a variable value.

In the coordinate conversion unit 301, processing of converting feature coordinate map information in the three-dimensional space including also depth information estimated by the feature coordinate map estimation unit 206 and a position and attitude estimation value by the position and attitude estimation unit 207 into feature point coordinates in a photographed image is performed. The coordinate conversion unit 301 first converts three-dimensional feature coordinates in a world coordinate system estimated by the feature coordinate map estimation unit 206 into three-dimensional feature coordinates in a camera coordinate system.

FIG. 5 is a diagram showing a relationship between a coordinate position of an object in world coordinates and a coordinate position in camera coordinates. T is a vector from an origin OW of the world coordinates to an origin OC of the camera coordinates. (rx,ry,rz) indicates a unit vector representing a direction of each axis (x,y,z) of the camera coordinates as viewed in the world coordinates. It is assumed that a point (x,y,z) in the camera coordinate system is expressed as a point (X,Y,Z) in the world coordinate system. A relationship between these coordinates is as follows.

$$\begin{bmatrix} x \\ y \\ z \end{bmatrix} = R \left( \begin{bmatrix} X \\ Y \\ Z \end{bmatrix} - T \right) \quad R = \begin{bmatrix} r_x^T \\ r_y^T \\ r_z^T \end{bmatrix} \quad \text{(Equation 6)}$$

In Equation 6, R represents a rotation matrix, and T represents a parallel translation vector. R and T are calculated by the position and attitude estimation unit 207.

Next, conversion from three-dimensional feature coordinates of the camera coordinate system into coordinates in the photographed image which are converted by Equation 6 is performed, for example, by perspective conversion. FIG. 6 shows a model of perspective projection when a virtual imaging surface is set at a position of a focal point distance f in front of a lens. A point O in FIG. 6 represents a center of a camera lens, and a Z axis represents an optical axis of a camera. In addition, a coordinate system having the point O as the origin indicates the camera coordinate system. (X,Y,Z) indicates a coordinate position of an object in the camera coordinate system. Image coordinates projected from the camera coordinates (X,Y,Z) of an object by perspective conversion are expressed as (x,y). An equation for converting (X,Y,Z) into (x,y) is expressed as the following equation.

$$x = f \frac{X}{Z}, \quad y = f \frac{Y}{Z} \quad \text{(Equation 7)}$$

It is possible to convert a three-dimensional feature coordinate map which is estimated by the feature coordinate map estimation unit 206 and includes a depth of a subject into two-dimensional feature coordinates on a photographed image using Equation 7.

The adder 302 of FIG. 7 subtracts an output of the coordinate conversion unit 301 from an output of the feature point tracking unit 209. An error (a position coordinate error) between position coordinates of feature coordinates actually observed by the feature point tracking unit 209 and two-dimensional feature coordinates obtained by conversion from a feature coordinate map of a target subject is calculated. The FB gain unit 303 and the bias estimation gain unit 304 multiply the position coordinate error by each gain value, and calculate a position and attitude estimation correction value and a bias correction value.

The position coordinate error calculated by the adder 302 is an error between feature point coordinates on a photographing screen which are actually observed and feature point coordinates obtained by projecting a three-dimensional coordinate map onto the photographing screen. Therefore, if a three-dimensional coordinate map value and a feature coordinate tracking value obtained by observation are correct, the position coordinate error is caused by an error of position and attitude estimation when the three-dimensional coordinate map is projected onto the photographing screen. A position and attitude estimation correction value and a bias estimation value (a correction value) is fed back to a result of the position and attitude estimation by the adders 406, 415, 402, and 409 such that this coordinate error amount becomes zero, and thereby the position and attitude estimation value approaches its true value.

In the present embodiment, each gain value of the FB gain unit 303 and the bias estimation gain unit 304, and a frequency of position and attitude correction are changed according to a result of determination of a vibration sensor noise determination unit (hereinafter, simply referred to as a noise determination unit) 211.

Figure 8A:
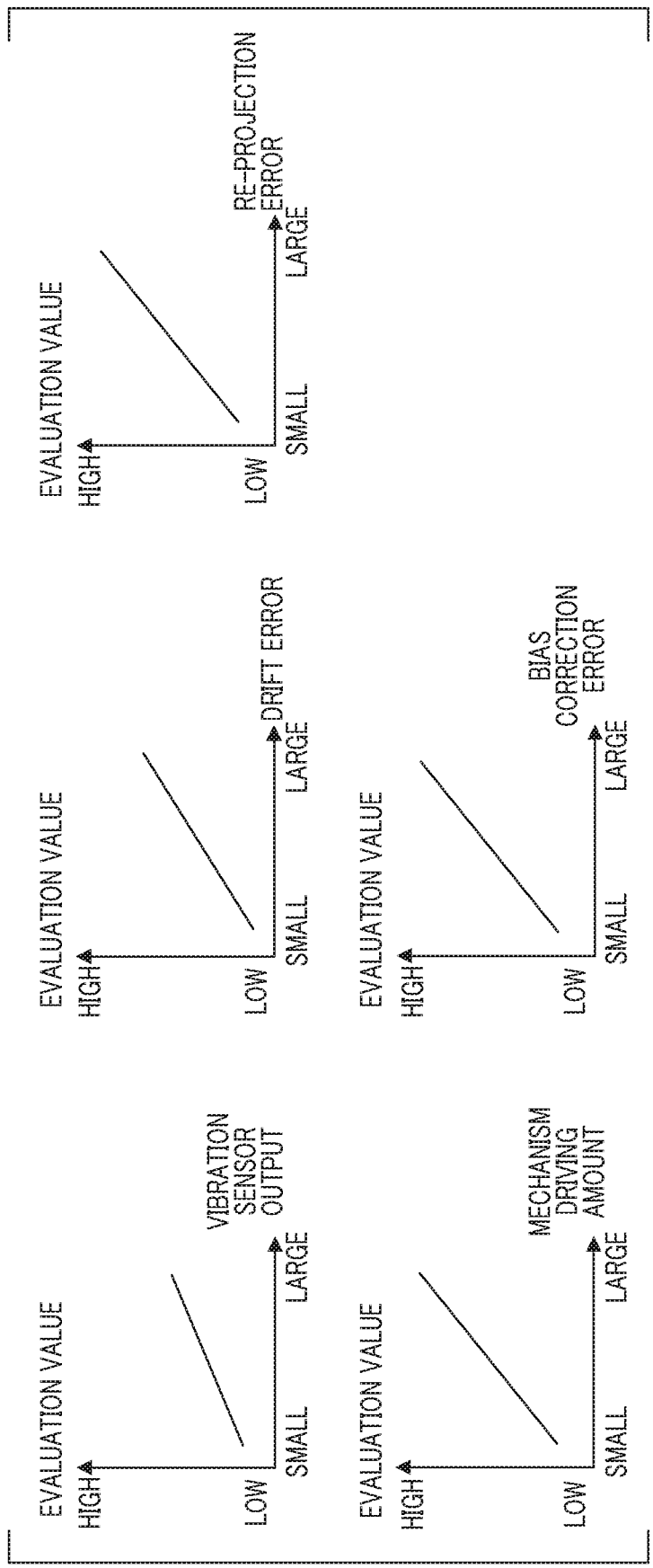
FIGS. 8A and 8B are diagrams which represent relationships between a magnitude of vibration sensor noise and control parameters.
Figure 8B:
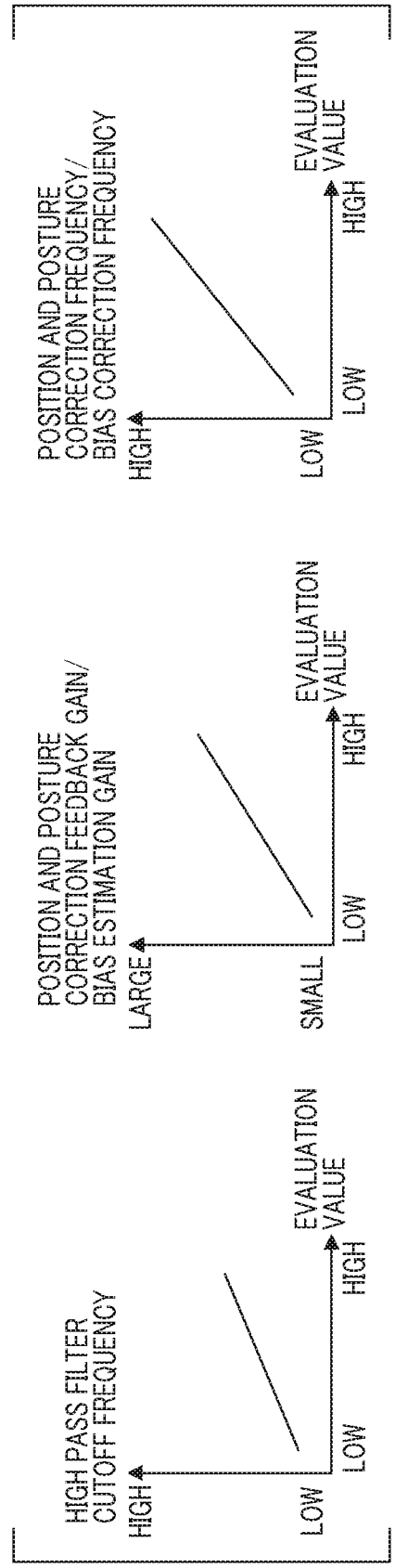

With reference to FIGS. 8A and 8B, a relationship between noise determination by the noise determination unit 211 and correction of a position and attitude estimation value will be described. In the position and attitude estimation by the position and attitude estimation unit 207, operations are performed using each output of the first vibration sensor 201 and the second vibration sensor 203. For this reason, if a bias value and a drift value of the vibration sensors are large, or in a situation with large vibration, an error may occur in the estimation value. If there is a possibility that an error may occur in the estimation value, the noise determination unit 211 calculates an evaluation value and changes control content on the basis of the evaluation value. As a result, it is possible to improve the accuracy of position and attitude estimation.

FIG. 8A is a schematic diagram which shows a relationship between determination content by the noise determination unit 211 and an evaluation value. The horizontal axis represents a magnitude to be determined, and the vertical axis represents an evaluation value. FIG. 8B shows a relationship between an evaluation value and a correction control parameter. The horizontal axis represents an evaluation value, and the vertical axis represents a correction control parameter.

The noise determination unit 211 determines a noise evaluation value according to the following conditions.

A case in which outputs of the first vibration sensor 201 and the second vibration sensor 203 are large For example, if an angle of view is significantly changed due to panning of the image pick-up apparatus 100, steep position and attitude variation occurs. An error may occur as a result of position and attitude estimation caused by the steep position and attitude variation. Accordingly, the noise determination unit 211 increases an evaluation value as outputs of the vibration sensors increase.

A case in which a drift error (a variation amount) occurs in the outputs of the vibration sensors after bias correction Since there is a possibility that a drift error may occur in a position and attitude estimation value, the noise determination unit 211 increases an evaluation value as a drift error increases.

A case in which a re-projection error occurs

A re-projection error is an error between tracking coordinates of a feature point calculated by the adder 302 of the position and attitude correction unit 208 and a coordinate value obtained by converting a feature coordinate map into feature coordinates on a photographing screen. The noise determination unit 211 increases an evaluation value as the re-projection error increases.

A case in which a driving amount or a driving velocity of a driving unit is large The image pick-up apparatus includes a mechanism section which drives the zoom unit 101, the image shake correction lens 103, the diaphragm/shutter unit 105, the focus lens 107, and the like. Alternatively, the mechanism section is provided in a lens device which can be mounted on a main body of the image pick-up apparatus. When a driving amount or a driving velocity of a driving unit related to the mechanism section is large, a vibration sensor detects vibration caused by mechanical driving, and an error may occur in a position and attitude estimation value. Therefore, the noise determination unit 211 increases an evaluation value as a driving amount or a driving velocity increases.

A case in which a bias correction error occurs in an output of a vibration sensor after bias correction If a bias estimation value deviates from its true value due to a bias correction error, there is a possibility that a drift error may occur in a position and attitude estimation value, and thus the noise determination unit 211 increases an evaluation value as the bias correction error increases.

According to determination results of the above conditions, control content is changed as shown in FIG. 8B.

Control to increase a cutoff frequency of a high pass filter as an evaluation value increases.

If an evaluation value increases, cutoff frequencies of the high pass filters 404, 412, and 417 are changed to higher frequencies than when an evaluation value is low.

Control to increase a gain value (correction magnification) as an evaluation value increases.

If an evaluation value increases, each gain value of the FB gain unit 303 and the bias estimation gain unit 304 becomes larger than when an evaluation value is low.

Control to increase a correction frequency as an evaluation value increases.

If an evaluation value increases, a frequency of position and attitude correction by the position and attitude correction unit 208 and a frequency of the correction of a position and attitude estimation value caused by bias correction are set to be higher than when an evaluation value is low.

As described above, if it is determined that a noise evaluation value of a vibration sensor is high, there is concern that an error may occur in position and attitude estimation of a low frequency component such as a low frequency drift due to detected noise of the vibration sensor. In the present embodiment, measures for removing a low frequency component are taken using a high pass filter. In addition, if a low frequency component is removed by a high pass filter, there is a possibility that a low frequency movement of a position and attitude estimation value may not be correctly detected by the position and attitude estimation unit 207. In the present embodiment, an estimation error in a low frequency range can be corrected by increasing a gain value of the FB gain unit 303. There are measures other than increasing a gain value of position and attitude correction and a gain value of bias estimation. For example, there is a method of shortening an estimation cycle of feature coordinate estimation by the feature coordinate map estimation unit 206, and an operation cycle of a correction value and a bias correction value of position and attitude estimation by the position and attitude correction unit 208. In this case, the noise determination unit 211 instructs the feature coordinate map estimation unit 206 regarding an estimation cycle, and instructs the position and attitude correction unit 208 regarding a correction cycle (an operation cycle of a correction amount). In addition, it is possible to obtain the same effect as the method of increasing a correction gain value by increasing the number of times correction of position and attitude estimation value and bias is performed by the adders 402, 406, 409, and 415 at a predetermined time, that is, by increasing a correction frequency. In this case, the noise determination unit 211 instructs the position and attitude estimation unit 207 regarding the number of times correction is performed per predetermined period.

If each gain value of the FB gain unit 303 and the bias estimation gain unit 304 is increased, a correction velocity of position and attitude increases, and thus it is possible to bring an estimation value closer to its true value sooner. However, in a case in which tracking of a feature point detected from an image is not possible, or a case in which a noise component is superimposed on the tracking coordinates of a feature point, there is a possibility of an error occurring in a corrected estimation result. For this reason, it is desirable that a gain value not be set too high. In the present embodiment, the correction gain and the cutoff frequency of a high pass filter are not always set to be high, and control content is changed on the basis of a determination result of an evaluation value by the noise determination unit 211. When vibration sensor noise and the like are large and an evaluation value is high, control content is changed in accordance with the situation. As a result, it is possible to increase accuracy in position and attitude estimation.

Figure 9:
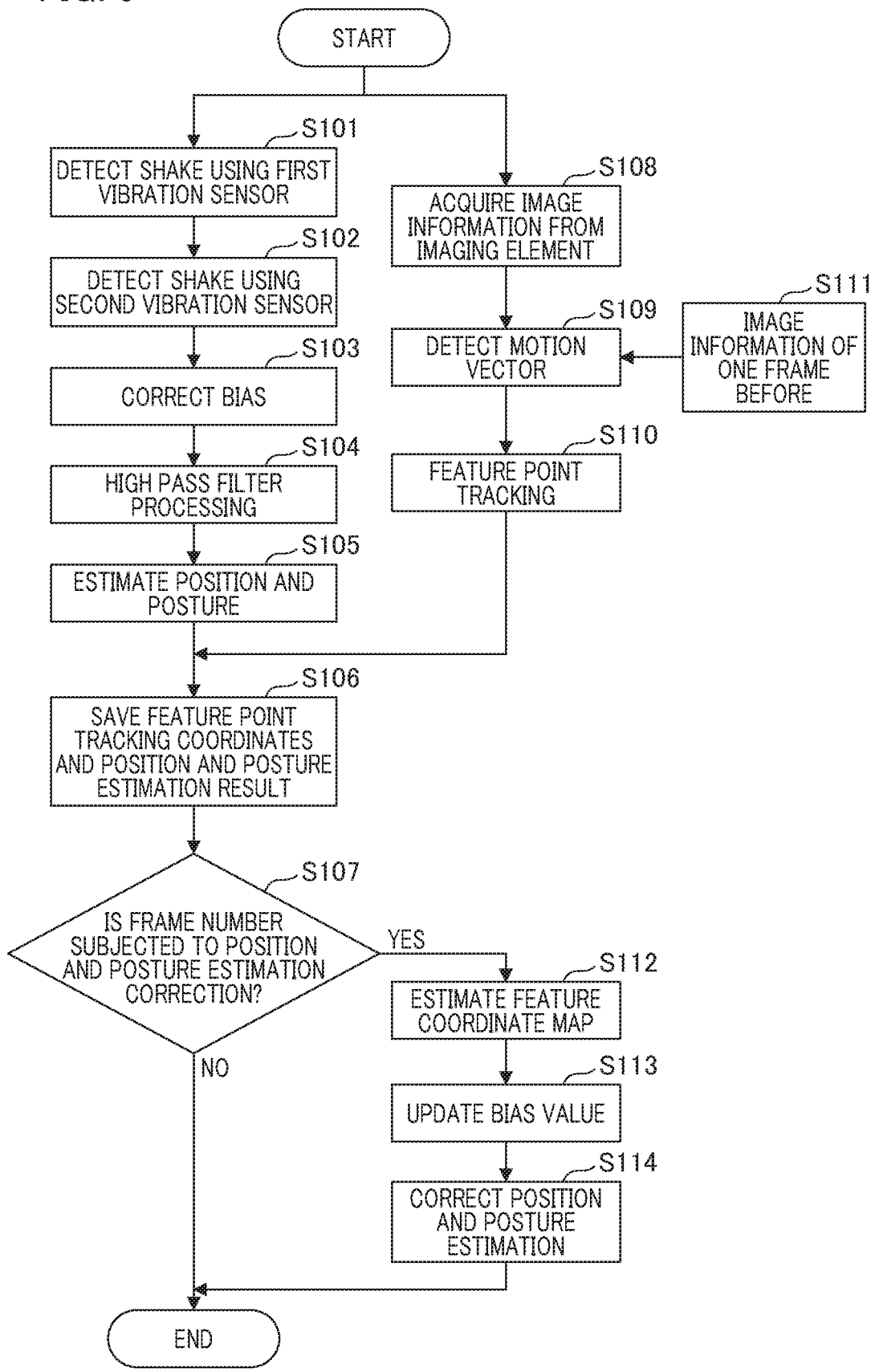
FIG. 9 is a flowchart of position and attitude estimation processing according to the first embodiment.

With reference to a flowchart of FIG. 9, position and attitude estimation processing of the image pick-up apparatus 100 will be described. Processing of S101 to S105 and processing of S108 to S110 in FIG. 9 are executed as parallel processing.

First, in S108, the imaging unit 109 converts an optical signal image-formed through an imaging optical system from a subject into an electric signal, and acquires an image signal. Next, the imaging signal processing unit 110 converts an analog signal into a digital signal and performs predetermined image processing. The motion vector detection unit 210 calculates a motion vector on the basis of a plurality of pieces of image data having different image times (S109). The motion vector detection unit 210 acquires an image of one frame before, which is stored in a memory (S111), compares the image with an image of a current frame, and calculates a motion vector on the basis of a deviation between the images. Methods of detecting a motion vector include a correlation method, a block matching method, and the like. In the present invention, any method can be used as a method of calculating a motion vector.

The feature point tracking unit 209 detects and tracks a movement position of the coordinates of a predetermined feature point on a photographed image on the basis of motion vector information of a detected image in each frame at the time of photographing moving images (S110). With regard to a feature point tracking technology, there is a method of obtaining a point at which there is the smallest residual in a window between frames if a square window centered on a feature point is provided and a new frame of a target image (or video) is given. Processing by this method is repeatedly executed at a cycle corresponding to a frame rate of image acquisition of moving image photographing. After the processing of S110, the procedure proceeds to S106.

Next, the position and attitude estimation processing will be described with reference to S101 to S105 of FIG. 9.

The first vibration sensor 201 detects the angular velocity of the image pick-up apparatus 100 (S101), and the second vibration sensor 203 detects the acceleration of the image pick-up apparatus 100 (S102). Next, bias correction of the first vibration sensor 201 and the second vibration sensor 203 is performed using a bias correction value estimated by the position and attitude correction unit 208 according to processing in a previous sampling cycle (S103). Each of the high pass filters 404, 412, and 417 whose cutoff frequencies are set by the noise determination unit 211 outputs a band-limited signal (S104). A position and attitude estimation value is calculated by the operation described above (S105).

The tracking coordinates of a feature point detected in S110 and the position and attitude estimation value calculated in S105 are stored in the storage unit 118 as one set of information (S106). In the following S107, it is determined whether a current frame number corresponds to a moving image frame number subjected to position and attitude estimation correction by the position and attitude correction unit 208. Whether a current frame is a moving image frame on which position and attitude estimation correction is performed is determined by whether or not as many sets of feature coordinates and position and attitude estimation values as the number of frames required for estimation of a feature coordinate map are aligned. For example, in the case of the estimation processing of a feature coordinate map shown in FIG. 4, estimation can be performed from a state in which the number of frames is two or more. Therefore, the procedure proceeds to the processing of S112 at a time at which information for two frames is acquired. If the number of frames is not enough, the procedure ends. A method of shortening an estimation cycle or an operation cycle, or increasing a correction frequency using the noise determination unit 211 as a measure different from the method of increasing a gain value of position and attitude correction and a bias estimation gain value as an evaluation value increases has been described. In these cases, the number of frames subjected to position and attitude estimation correction, which is determined in S107, is set to the smaller number of frames. This is because control to shorten an operation cycle of a position and attitude estimation correction value and a bias correction value and to increase the number of times correction of a position and attitude estimation value and a bias value using the adders 402, 406, 409, and 415 at a predetermined time is performed.

After the estimation processing of a feature coordinate map is executed in S112, a bias value is updated by the position and attitude correction unit 208 (S113). Then, the correction processing of a position and attitude estimation value is performed (S114), and the series of processing ends. If a negative determination is made in S107 (NO), the correction of a bias value and a position and attitude estimation value is not performed and processing ends.

According to the present embodiment, position and attitude estimation and feature coordinate map estimation processing of an imaging pick-up apparatus and correction of a position and attitude estimation value are repeatedly executed in each frame of moving images, and thereby it is possible to obtain a correct position and attitude estimation value.

Second Embodiment

Next, a second embodiment of the present invention will be described. The same components of the present embodiment as in the first embodiment will be given reference numerals already used in the first embodiment, and descriptions thereof will be omitted.

Figure 10:
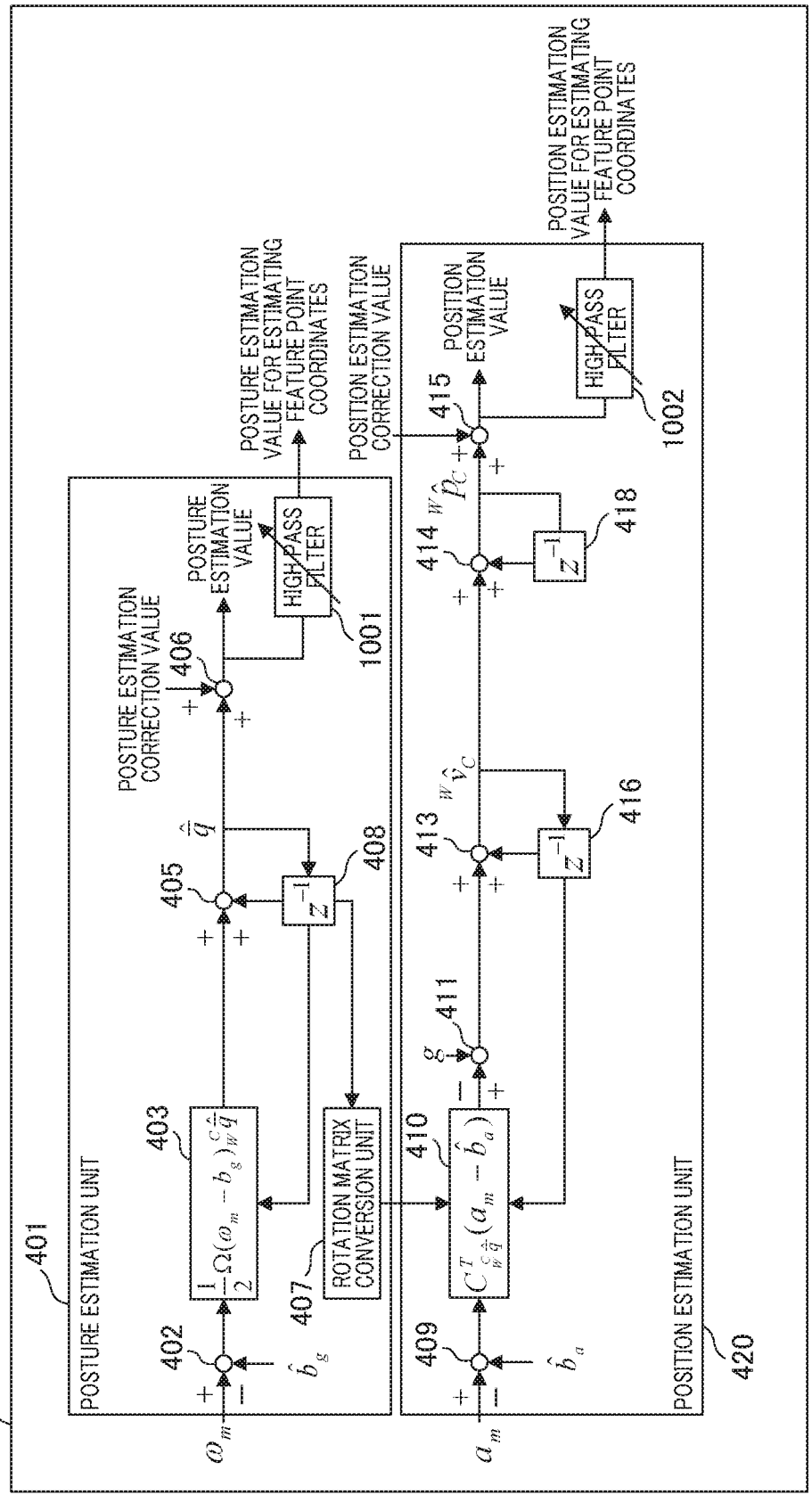
FIG. 10 is a diagram which describes an internal configuration of a position and attitude estimation unit according to a second embodiment of the present invention.

FIG. 10 is a diagram which shows a configuration example of the position and attitude estimation unit 207 of the present embodiment. The following are differences from the configuration shown in FIG. 3.

The high pass filters 404, 412, and 417 which perform band limitation of a frequency band are removed.

Unlike the position and attitude estimation of the first embodiment, high pass filters 1001 and 1002 for change information of position and attitude estimation for feature point coordinate estimation are added.

The high pass filter 1001 performs filter processing on an output of the adder 406, and outputs an attitude estimation value for feature point coordinate estimation to the feature coordinate map estimation unit 206. The high pass filter 1002 performs filter processing on an output of the adder 415, and outputs a position estimation value for feature point coordinate estimation to the feature coordinate map estimation unit 206. Both of the high pass filters 1001 and 1002 are filters capable of changing a cutoff frequency.

FIG. 11 is a flowchart which describes the position and attitude estimation processing according to the present embodiment. The following are differences from FIG. 9.

With no high pass filter processing of S104 of FIG. 9, the procedure proceeds to position and attitude estimation processing of S105 after bias correction processing of S103.

In S1101 between S105 and S106, the high pass filters 1001 and 1002 perform each processing on change information of position and attitude (change in the position and attitude estimation value) used for feature coordinate map estimation.

In the present embodiment, band limitation processing by a high pass filter is not performed on an estimation value of a position and attitude change at a low frequency by a vibration sensor in the position and attitude estimation unit 207. As a result, it is possible to improve estimation accuracy of a position and attitude change which is slow at a low frequency. On the other hand, it is found that an influence of large deviation (particularly, a drift of position) of position and attitude estimation greatly affects estimation accuracy in three-dimensional coordinate estimation by the feature coordinate map estimation unit 206. Therefore, a low frequency component is removed by the high pass filters 1001 and 1002 only for a change in position and attitude estimation value used for three-dimensional coordinate estimation to reduce and improve an error of the three-dimensional coordinate estimation caused by a drift error of a position estimation value.

According to the present embodiment, it is possible to improve estimation accuracy of a three-dimensional coordinate estimation value, and to improve accuracy of position and attitude estimation by correction of a position and attitude estimation value. Even when there is a large variation in an error of vibration sensor information, it is possible to provide an image pick-up apparatus capable of obtaining a position and attitude estimation result with higher accuracy and a control method thereof.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-151024, filed Aug. 3, 2017, which is hereby incorporated by reference wherein in its entirety.

What is claimed is:

1. An image pick-up apparatus that acquires an image signal using an imaging unit comprising:
a memory; and
one or more processors, wherein the processor functions as the following units according to a program stored in the memory:
a first acquisition unit configured to acquire first information indicating shake of the image pick-up apparatus detected by a shake detection unit;
a second acquisition unit configured to acquire second information indicating a movement of a subject detected in an image signal by the imaging unit; and
an estimation unit configured to estimate a position or attitude of the image pick-up apparatus,
wherein the estimation unit includes a calculation unit configured to calculate an estimation value of the position or attitude of the image pick-up apparatus according to the band-limited first information or the first and second information, and a correction unit configured to calculate a correction value for the estimation value using the second information.

2. The image pick-up apparatus according to claim 1,
wherein the estimation unit includes a band limitation unit configured to limit a frequency band of the first information,
wherein the calculation unit calculates the estimation value according to the first information band-limited by the band limitation unit, and
wherein the estimation unit corrects the estimation value in accordance with the correction value.

3. The image pick-up apparatus according to claim 1,
wherein the calculation unit calculates the estimation value according to the first and second information, and
wherein the estimation unit includes a band limitation unit configured to limit a frequency band with respect to an estimation value corrected by the correction value.

4. The image pick-up apparatus according to claim 1, wherein the estimation unit includes an evaluation unit configured to calculate an evaluation value of an estimation error, and changes the frequency band limited by the band limitation unit in accordance with the evaluation value, or changes a correction magnification at the time of correcting the estimation value according to the correction value.

5. The image pick-up apparatus according to claim 4, wherein the evaluation unit performs noise determination of the shake detection unit according to the evaluation value.

6. The image pick-up apparatus according to claim 5,
wherein the evaluation value in a case in which an output of the shake detection unit or a variation amount of the output is large becomes higher than the evaluation value in a case in which an output of the shake detection unit or a variation amount of the output is small.

7. The image pick-up apparatus according to claim 5, wherein the evaluation value in a case in which a bias correction error of the shake detection unit is large becomes higher than the evaluation value in a case in which a bias correction error of the shake detection unit is small.

8. The image pick-up apparatus according to claim 4, wherein the processor further functions as a tracking unit configured to perform feature point tracking by calculating a coordinate value of a subject on a photographing screen using the second information,
wherein the estimation unit generates a feature coordinate map indicating a positional relationship including a position or attitude or the position and attitude of the image pick-up apparatus, and a depth of the subject regarding the image pick-up apparatus on the basis of the first information and a coordinate value of the subject, and calculates a re-projection error, which is an error between tracking coordinates of the feature point and a coordinate value obtained by converting the feature coordinate map into feature coordinates on the photographing screen.

9. The image pick-up apparatus according to claim 8, wherein the evaluation value in a case in which the re-projection error is large becomes higher than the evaluation value in a case in which the re-projection error is small.

10. The image pick-up apparatus according to claim 4, wherein the evaluation value in a case in which a driving amount or a driving velocity of a driving unit included in the image pick-up apparatus or a lens device mounted on a main body of the image pick-up apparatus is large becomes higher than the evaluation value in a case in which a driving amount or a driving velocity of the driving unit is small.

11. The image pick-up apparatus according to claim 10, wherein the driving unit drives a lens, a diaphragm, or a shutter that constitutes an imaging optical system.

12. The image pick-up apparatus according to claim 4, wherein the estimation unit increases a cutoff frequency of the band limitation unit as the evaluation value increases.

13. The image pick-up apparatus according to claim 4, wherein the estimation unit increases the correction magnification or a correction frequency as the evaluation value increases.

14. The image pick-up apparatus according to claim 4, wherein the estimation unit shortens a cycle of estimation or a cycle for performing an operation of the correction value as the evaluation value increases.

15. The image pick-up apparatus according to claim 1, wherein the processor further functions as a tracking unit configured to perform feature point tracking by calculating a coordinate value of a subject on a photographing screen using the second information,
wherein the estimation unit generates a feature coordinate map indicating a positional relationship including a position or attitude or the position and attitude of the image pick-up apparatus, and a depth of the subject regarding the image pick-up apparatus on the basis of the first information and a coordinate value of the subject.

16. The image pick-up apparatus according to claim 15, wherein the correction unit estimates feature coordinates of the subject on the photographing screen on the basis of the feature coordinate map and the estimation value of a position or attitude of the image pick-up apparatus, and calculates the correction value on the basis of an estimation value of the feature coordinates on the photographing screen and tracking coordinates of a feature point calculated by the tracking unit.

17. The image pick-up apparatus according to claim 16, wherein the correction unit includes:
a conversion unit configured to acquire the estimation value of a position or attitude of the image pick-up apparatus and the feature coordinate map, and to convert the feature coordinate map into feature coordinates on a photographing screen;

a subtraction unit configured to subtract an output of the conversion unit from the tracking coordinates of the feature point calculated by the tracking unit; and a gain unit configured to calculate the correction value by multiplying an output of the subtraction unit by a gain value.

18. The image pick-up apparatus according to claim 1, wherein the shake detection unit is an angular velocity sensor or an acceleration sensor, or an angular velocity sensor and an acceleration sensor.

19. The image pick-up apparatus according to claim 1, wherein the processor further functions as a detection unit configured to detect a motion vector as the second information.

20. A method executed in an image pick-up apparatus that acquires an image signal using an imaging unit, the method comprising:

acquiring first information indicating shake of the image pick-up apparatus detected by a shake detection unit and second information indicating a movement of a subject detected in an image signal by the imaging unit; and estimating a position or attitude of the image pick-up apparatus, wherein the estimating includes calculating an estimation value of the position or attitude of the image pick-up apparatus according to the band-limited first information or the first and second information, and calculating a correction value for the estimation value using the second information.

* * * * *